United States Patent [19]
Grimes et al.

[11] Patent Number: 5,311,570
[45] Date of Patent: May 10, 1994

[54] INTEGRATION OF WIRELESS PAGING IN A COMMUNICATION SYSTEM

[75] Inventors: Gary J. Grimes, Thornton; Lawrence J. Haas, Broomfield, both of Colo.

[73] Assignee: AT&T Bell Laboratories, Murray Hill, N.J.

[21] Appl. No.: 699,084

[22] Filed: May 10, 1991

[51] Int. Cl.⁵ .................................................. H04M 11/00
[52] U.S. Cl. ................................... 379/57; 379/58; 340/825.44
[58] Field of Search ................... 379/56, 57, 58, 67, 379/59, 170; 340/825.44

[56] References Cited

U.S. PATENT DOCUMENTS

| | | | |
|---|---|---|---|
| 4,608,458 | 8/1986 | Hashimoto | 179/2 A |
| 4,637,022 | 1/1987 | Burke et al. | 455/31.1 |
| 4,642,425 | 2/1987 | Guinn, Jr. et al. | 379/57 |
| 4,658,416 | 4/1987 | Tanaka | 379/57 |
| 4,661,972 | 4/1987 | Kai | 379/56 |
| 4,680,785 | 7/1987 | Akiyama et al. | 379/57 |
| 4,748,655 | 5/1988 | Thrower et al. | 379/57 X |
| 4,906,989 | 3/1990 | Kasugai | 379/56 |
| 4,940,963 | 7/1990 | Gutman et al. | 379/57 |
| 5,109,405 | 4/1992 | Morganstein | 379/67 |
| 5,117,449 | 5/1992 | Metroka et al. | 379/58 |

FOREIGN PATENT DOCUMENTS

| | | | |
|---|---|---|---|
| 2541020 | 8/1984 | France | G08B 5/00 |
| 62-179254 | 1/1988 | Japan | H04M 1/64 |
| 0296846 | 11/1989 | Japan | 379/57 |
| 2158678 | 11/1985 | United Kingdom | H04Q 7/00 |
| 2222503 | 3/1990 | United Kingdom | H04Q 7/04 |

Primary Examiner—Curtis Kuntz
Assistant Examiner—G. J. Oehling
Attorney, Agent, or Firm—David R. Padnes

[57] ABSTRACT

A communications switching system such as a PBX, central office switch and the like, responds to an incoming call to a called party by signaling a paging device as well as some other communications device having communications capability different from that of the paging device. In the disclosed embodiment, which pertains to a private branch exchange (PBX), this other communications device is one which provides two-way voice communications. Advantageously, the paging device may also be provided with the capability of signalling the communications system that the called party will shortly answer the call via a communications device possessing two-way voice communications. Upon receipt of this pager-transmitted signal, the communications system, if desired, can be provided with the ability to provide an announcement to the calling party of the called party's intent to answer the call. Once the called party reaches any voice communications device connected to the system, the incoming call is redirected to that device upon the called party providing a predetermined identification to the communications system.

19 Claims, 8 Drawing Sheets

FIG. 2
TRANSLATION MEMORY INFORMATION

- 201 — EXTENSION NUMBER: _____
- 202 — PAGER DIGITAL CODE: _____
- 203 — LINE INTERFACE CIRCUIT (LIC): _____
- 204 — PORT ON LIC: _____
- 205 — NAME: _____
- 206 — COMMUNICATIONS DEVICE TYPE: _____
- 207 — PAGER TYPE: _____
- 208 — PAGER CODE WORD: _____
- 209 — PRIORITY NUMBER LIST: _____
- 210 — CALL COVERAGE EXTENSION: _____

TRANSLATION MEMORY 111

FIG. 3
STATUS MEMORY INFORMATION

- 301 — EXTENSION NUMBER: _____
- 302 — CALL STATUS TABLE
- 303-1 — CALL 1        ACTIVE OR INACTIVE
  - CALL 2        ACTIVE OR INACTIVE
- 303-N — CALL N        ACTIVE OR INACTIVE
- 304 — FEATURE STATUS TABLE
- 305 — SEND ALL CALLS   ACTIVE OR INACTIVE
- 306 — PRIORITY PAGING  ACTIVE OR INACTIVE
- 307 — PAGER STATUS TABLE
- 308 — PAGER           ACTIVE OR INACTIVE
- 309 — PAGER           NEAR WIRED SET (YES/NO)

STATUS MEMORY 112

PHYSICAL ARRANGEMENT OF A WIRED OR WIRELESS COMMUNICATIONS DEVICE

PHYSICAL LAYOUT OF PAGER

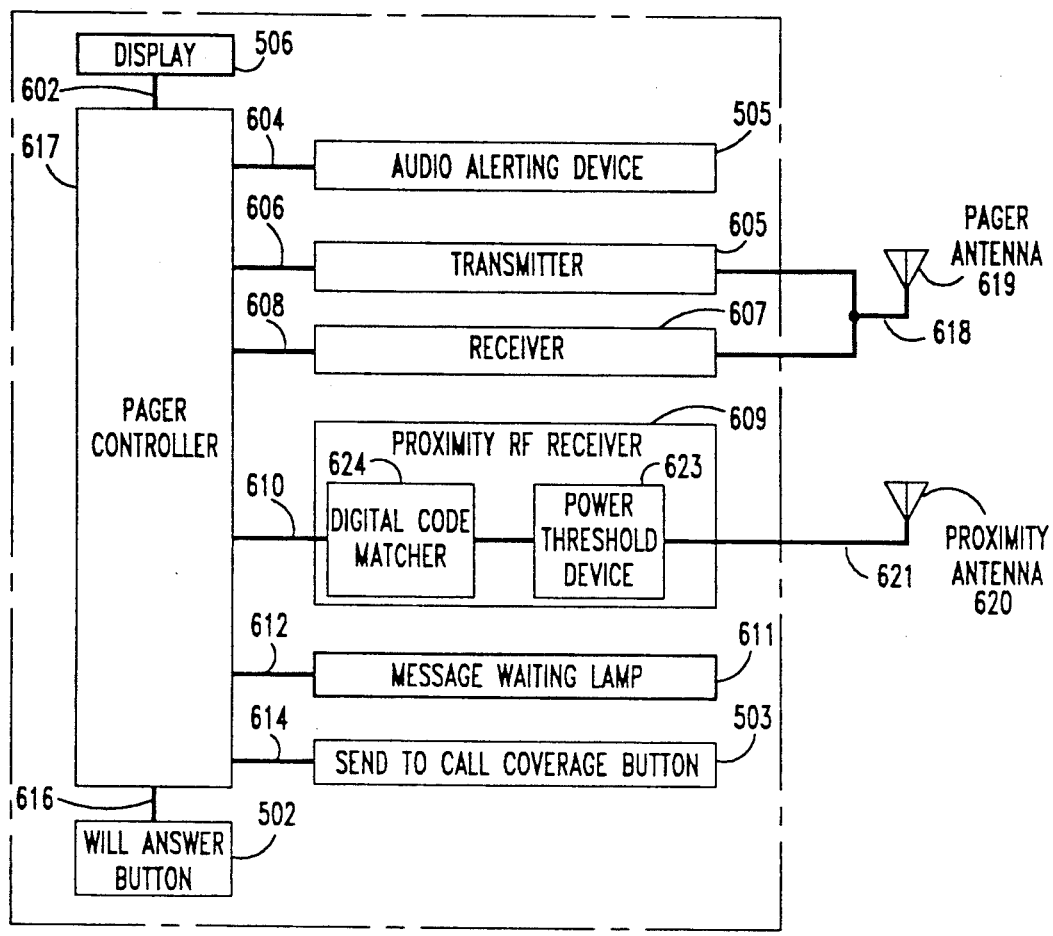
FIG. 6 PAGER BLOCK DIAGRAM
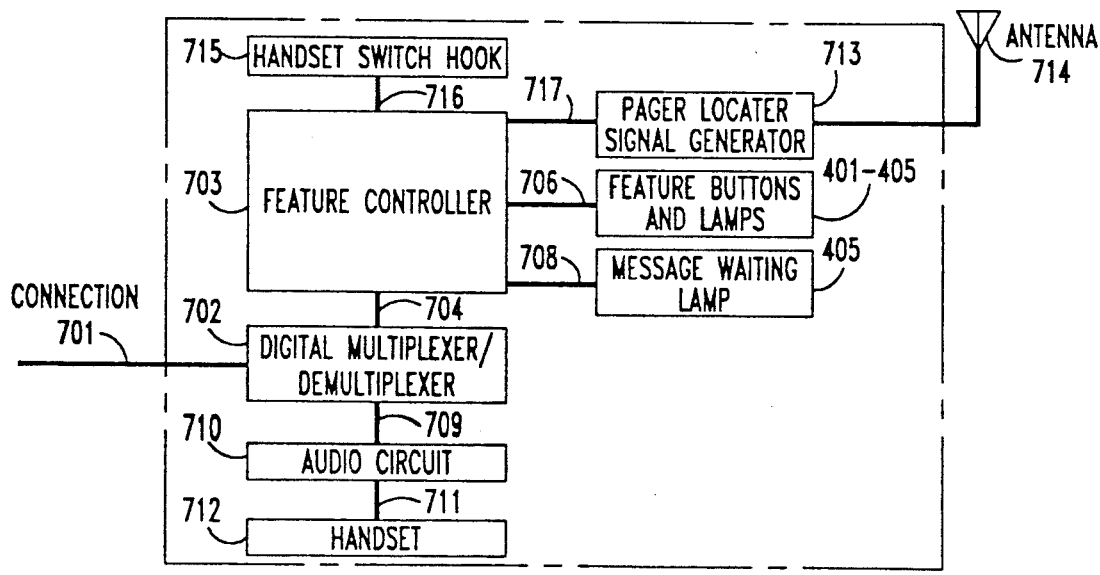
FIG. 7
BLOCK DIAGRAM OF WIRED OR WIRELESS COMMUNICATIONS DEVICE

INTEGRATION OF WIRELESS PAGING IN A COMMUNICATION SYSTEM

TECHNICAL FIELD

The present invention relates to communications systems and, more particularly, to a technique for integrating the call processing of incoming calls to a called party associated with both wireless paging and another wired or wireless communications device possessing full two-way communications capabilities.

BACKGROUND OF THE INVENTION

A variety of wired and wireless communications devices, each offering a panoply of capabilities, are available to suit an individual's needs. Wired communications devices are those which require a signal-conducting path, other than air, between the communications device and a communications system, such as a central office switch or private branch exchange (PBX). The signal-conducting path can take many physical forms, including a number of different kinds of metallic conductors or optical fibers. In contrast, wireless communications devices, such as paging and cellular radio communications devices, utilize the air as the medium to transport signals to and from the communications system. The distinction between paging and cellular radio devices resides in their communications capabilities. Paging devices are portable one-way communications devices which respond to associated radio signals which are broadcasted while cellular radio devices provide full two-way communications capabilities.

With a paging device, the reception of a predetermined radio signal typically activates an audible and/or visual alarm to indicate that the person carrying the pager should make a call to a predetermined telephone number to receive a message. Or, in the alternative, the paging device may have the capability to receive an incoming message which can be displayed. This message communicates a predefined amount of information which may be the telephone number of a calling party.

There are many situations where an individual may have a pager as well as a wired or wireless communications device possessing full two-way communications capabilities to receive incoming calls. Such situations include a hospital, manufacturing, education and general office environments where it is desirable that an individual be notified of incoming calls independent of whether that individual is in close proximity to his/her associated full, two-way communications device. In such situations, it is necessary that a communications system have the capability of notifying a called party of an incoming call by signalling any paging device associated with that called party. Present techniques which provide such signalling broadcast a signal to the paging device associated with the called party. The shortcoming of this technique is that a telephone number different from that associated with the called party must be dialed in order to activate such a broadcast. As a result, a calling party must dial two different telephone numbers, the first associated with the called party's wired full two-way or wireless communications device and then, if the called party does not answer, dials a second number to alert the called party via his/her paging device. If the second number is dialed, the calling party must also wait for a return call from the called party since the paging device cannot provide two-way communications capabilities. This scenario often results in considerable telephone tag, i.e., situations where two individuals periodically try to contact one another and fail because the other person is unavailable.

While the use of cellular communications devices with full two-way communications devices can alleviate much of the foregoing problems associated with paging devices, cellular radio devices give rise to a set of other problems. One such problem is that cellular telephones are expensive and this expense is not merely that of the portable communications device but also that of the necessary transceivers which must be disposed to provide substantially uniform communications coverage within a given environment. It should be noted in this regard that the requirements of supporting apparatus associated with two-way cellular radio devices are considerably more sophisticated than those associated with paging devices because the former must provide intelligible two-way communications. Another problem is that the requirements for cellular two-way radio devices may be difficult, if not impossible, to achieve in certain noisy environments. Still another problem is that the required radio spectrum to provide cellular radio communications may not be available in certain environments or geographical areas.

In light of the foregoing, there are still considerable applications for paging devices and it would be desirable if a scheme could be devised which would eliminate the problems associated with the use of such devices.

SUMMARY OF THE INVENTION

In accordance with a broad aspect of the present invention, a communications system, such as a PBX, central office switch and the like, responds to an incoming call to a called party by signaling a paging device and some other communications device having communications capabilities different from that of the paging device. In the disclosed embodiment, this other communications device is one having two-way voice communications capability. Additional aspects can also be provided. In the disclosed embodiment, for example, the paging device is provided with the capability of signalling the communications system that the called party will shortly answer the call via a communications device which provides two-way voice communications. Upon receipt of this signal, the communications system, if desired, may be also provided with the ability to provide an announcement to the calling party of the called party's intent to answer the call. In any event, if the paging device is provided with the aforementioned ability to transmit a signal to the communications system, when the called party reaches any two-way voice communications device connected to the communications system, the incoming call can be redirected to that two-way device.

BRIEF DESCRIPTION OF THE DRAWING

FIGS. 2 and 3 are representations of the translation and status data respectively stored in the translation and status memories of the system of FIG. 1;

FIG. 6 is a block-schematic diagram of the pager of FIG. 5;

FIG. 7 is a block-schematic diagram of the wired or wireless communications device of FIG. 4.

DETAILED DESCRIPTION

Figure 1:
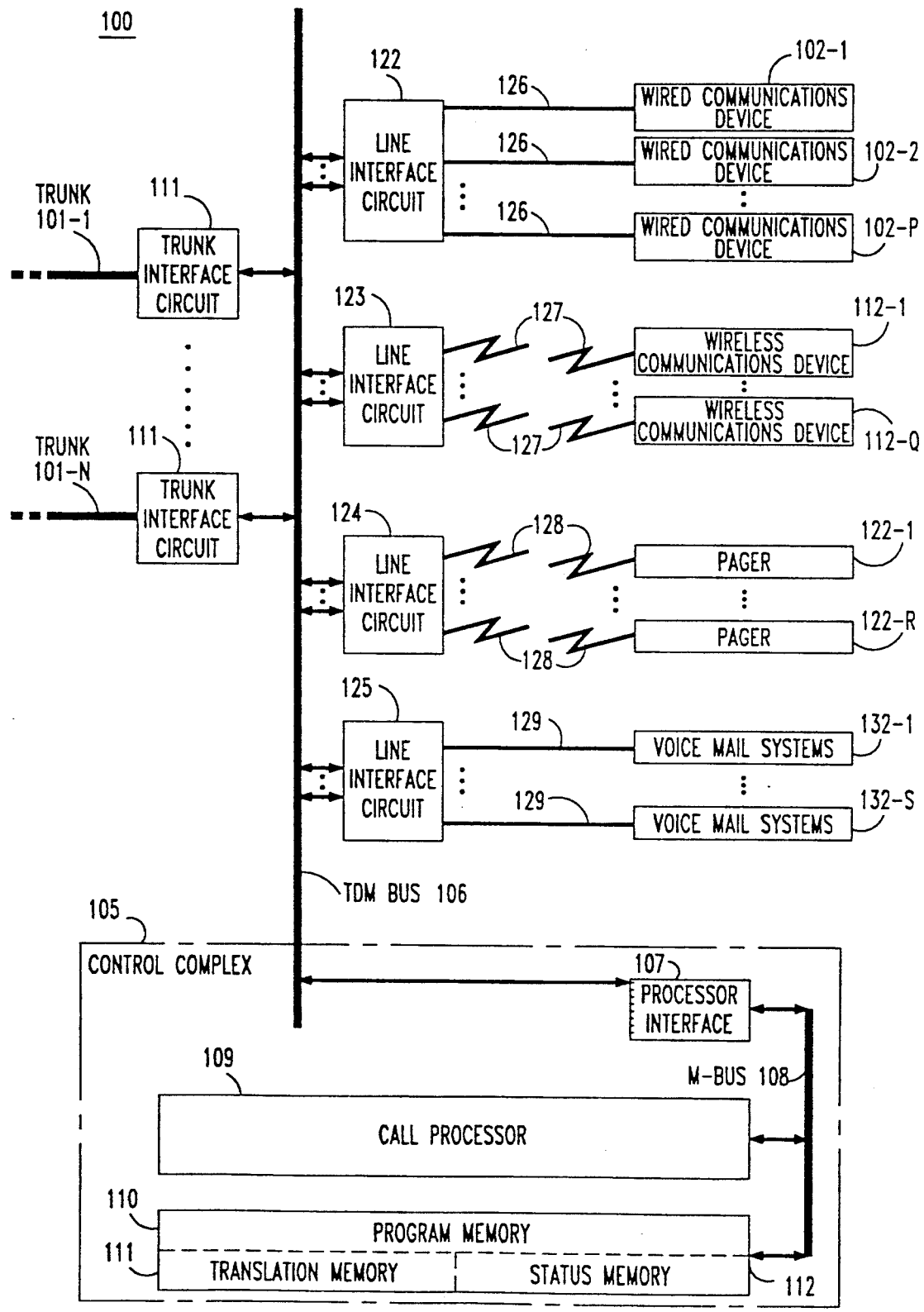
FIG. 1 is a block-schematic diagram of an exemplary communications system incorporating the present invention.

FIG. 1 shows an exemplary application of the present invention wherein PBX 100, for example, and AT&T Definity® telecommunications system has its "trunk" side connected to a plurality of trunks 101-1 through 101-N via trunk interface circuits 111 and its "line" side connected to a plurality of wired communications devices 102-1 through 102-P and wireless communications devices 112-1 through 112-Q via line interface circuits 122 and 123, respectively. (Definity is a registered trademark of AT&T). The trunks connect to an external communications network (not shown) which may be either a public or private network. Each of the variables P and Q is a predetermined integer and since a PBX may be designed to be blocking or nonblocking, the number of trunks, N, is less than or equal to the total number of wired and wireless communications devices, P+Q. A plurality of pagers 122-1 through 122-R and a plurality of voice mail systems 132-1 through 132-S are also connected to the line side of PBX 100 via line interface circuits 124 and 125, respectively. Each voice mail system has the capability of providing voice announcements to calling parties in certain circumstances, such as when the called party does not answer. The mix of wired and wireless communications devices, pagers and voice mail systems is arbitrary so that the integers P, Q, R and S can each vary to suit different applications. Furthermore, it should, of course, be understood that while, in the illustrative embodiment of the present invention, the wired or wireless communications devices provide full two-way voice communications capabilities, such devices can also provide a myriad of other communications functions and may include personal computers, video terminals, environmental sensing devices, such as smoke detectors, facsimile machines, etc. The connection between each port on line interface circuits 122 and 125 to its associated wired communications device and voice mail system is respectively provided by one of wired communications links 126 and 129. In similar fashion, the connection between each port on line interface circuits 123 and 124 to its associated wireless communications device and pager is respectively provided by one of the wireless communications links 127 and 128.

Each pager provides signal receiving capability and, pursuant to one aspect of the present invention, is associated with a respective one of the wired or wireless communications devices such that an incoming call to such a wired or wireless communications device will also automatically alert the pager. Advantageously, this automatic alerting capability can be automatically disabled when the pager and associated wired or wireless communications device are in close proximity to one another. In addition, pursuant to another aspect of the present invention, a pager is provided with limited transmission capability wherein a called party who is away from his associated wired or wireless communications device can signal call processor 109 within control complex 105 of an intent to respond to the call. Having such an intent, the called party can go to any of the wired or wireless communications devices 102-1 through 102-P or 112-1 through 112-Q and signal the communications system. In response to this signal, the call processor will ultimately direct the incoming call to the wired or wireless communications device from which the called party signalled.

Each of the wired and wireless communications devices is connected to a "port" of an associated one of line interface circuits 122 and 123, respectively. In similar fashion, each of the paging transceivers and voice mail systems is respectively connected to a port on an associated one of line interface circuits 124 and 125. Typically, each line interface circuit has a plurality of ports so that the total number of line interface circuits is less than the total number of wired and wireless communications devices, pagers and voice mail systems, i.e., P+Q+R+S.

PBX 100 provides a communications system switching interface for incoming, outgoing and internal communications. "Incoming" communications are those which originate within the external communications network and are destined for at least one of the wired or wireless communications devices. "Outgoing" communications are those which originate from one of these communications devices and are destined for some other communications device within the external communications network (both of the latter not shown). In FIG. 1, "internal" communications are those which originate from one of the communications devices and terminate on a different one of these communications devices. Of course, as is well-known, PBX 100 can be one PBX in a network of interconnected PBXs and, in such situations, internal communications can also originate from and terminate on communications devices in different PBXs in the network of PBXs.

The present invention addresses problems that arise in internal communications when the called party is associated with both a pager and a wired or wireless communications device possessing full two-way communications capabilities. In such a situation in the prior art, to reach such a called party, a calling party must dial two different telephone numbers or PBX extensions wherein one number is associated with the wired or wireless communications device and the other is associated with the paging device. As will be discussed, the present invention overcomes this problem by providing communications access to both such device via a single telephone number or PBX extension. Before describing how this accomplished, it is first necessary to briefly review the call processing capability of the PBX for incoming communications.

For any of the foregoing types of communications, signalling information has to be coupled to the destined communications device. This coupling of signalling information is through the control complex 105 but the voice/data communications which follow this signalling transfer is not coupled to the control complex, but rather is transferred directly between the trunk interface and line interface circuit by time-division-multiplexed (TDM) bus 106. Signalling for incoming communications, received via a trunk and its associated trunk interface circuit, are routed to control complex 105 via the TDM bus. Within the control complex, this signalling is serially coupled through processor interface 107 and M-bus 108 to call processor 109. Processor 109 utilizing software stored in program memory 110 and specific system information stored in translation memory 111 and status memory 112, processes the received dialed digits for the incoming communications to provide signalling to the destined communications device via its associated line interface circuit and communications link. This connection to the associated line interface circuit is provided via M-bus 108, processor interface 107 and TDM bus 106. Within the associated line interface circuit, the incoming signalling is routed to the port connected to the communications link extending to the destined communications device. Similarly, signalling for outgoing communications is outputted to the associated communications link and line interface circuit and then is routed to the control complex via the TDM bus. Within the control complex, the signalling for outgoing communications is serially routed through processor interface 107, M-bus 108 and call processor 109. Within the call processor, the dialed digits are analyzed utilizing software within program memory 110, specific system information stored in the translation and status memories and signalling interconnection is provided to one of the trunks and its associated trunk interface circuit in accordance with a predetermined routing scheme. This interconnection is provided via the M-bus, processor interface and TDM bus. Internal communications between at least two wired or wireless communications devices are processed in much the same fashion as just described with the call processor determining the associated line interface circuit associated with the destined communications device. The signalling connection to and from the call processor is provided via the TDM bus, processor interface and M-bus. If, however, the destined communications device in an internal communications is in another PBX networked with PBX 100, then the call processor routes the signalling to a preselected trunk and trunk interface circuit via the M-bus, processor interface and TDM bus. Within the other PBX, communications services are provided as if the communications originated within that PBX.

FIG. 2 shows the information in translation memory 111 utilized pursuant to the present invention. The first item in the translation memory is the extension number 201. This number is used to identify both the wired or wireless communications device along with any pager associated with this extension number. The pager digital code 202 is the digital code word to which the pager associated with extension number 201 is responsive. A given pager will be responsive to only one digital code 202 which is transmitted by a paging transceiver in communications system 100. The line interface circuit (LIC) number 203 and the port 204 on this LIC are used to identify the physical location of the communication system port interfacing the wired or wireless communications device. Name 205 is used to identify the user's name normally associated with extension number 201. The communications device type 206 is used to identify the type of communications device associated with extension number 201, so that the proper signaling sequence for this communications device can be implemented. Similarly, the pager type 207 is used to identify the type of pager so that the proper signaling sequence for this pager can be implemented. The pager code word 208 is used, for security purposes, to verify that the proper pager is responding to any page. This pager code word is automatically transmitted by the pager whenever it transmits signals to communications system 100. The priority number list 209 is a list of extensions or users' names to which the pager will respond when the "priority page" feature, as will be subsequently described, is activated. Finally, call coverage extension 210 identifies the telephone number or extension of the communications device to which calls directed to extension number 201 are forwarded when call coverage, a well-known feature in communications systems, is activated.

FIG. 3 shows the information in status memory 112 needed to implement the the present invention. Extension number 301 is analogous to extension number 201 of FIG. 2. The remainder of the status memory information is divided into three tables—the call status table 302, the feature status table 304, and the pager status table 307. Call status table 302 sets forth a list of entries which indicate whether any one of a predetermined integer number, N, of simultaneously receivable calls for an extension number is active or inactive at any given time. These entries are designated as 303-1 through 303-N. Feature status table 304 includes entries 305 and 306 which respectively indicate whether the send all calls and priority page features are active or inactive for an extension number. Pager status table 307 includes two entries with the first entry 308 indicating whether the pager associated with extension 301 is active or inactive and the second entry 309 indicating whether the pager is within a predetermined distance of its associated wired or wireless communications device. Entry 309 is used, as will be described, to enable or disable a pager's audible alerting mechanism in response to a page. Specifically, pursuant to the present invention, this alerting mechanism is deactivated when the pager is within a predetermined distance of its associated communications device because an audible alert in such a situation is unnecessary and irritating to system users.

Figure 4:
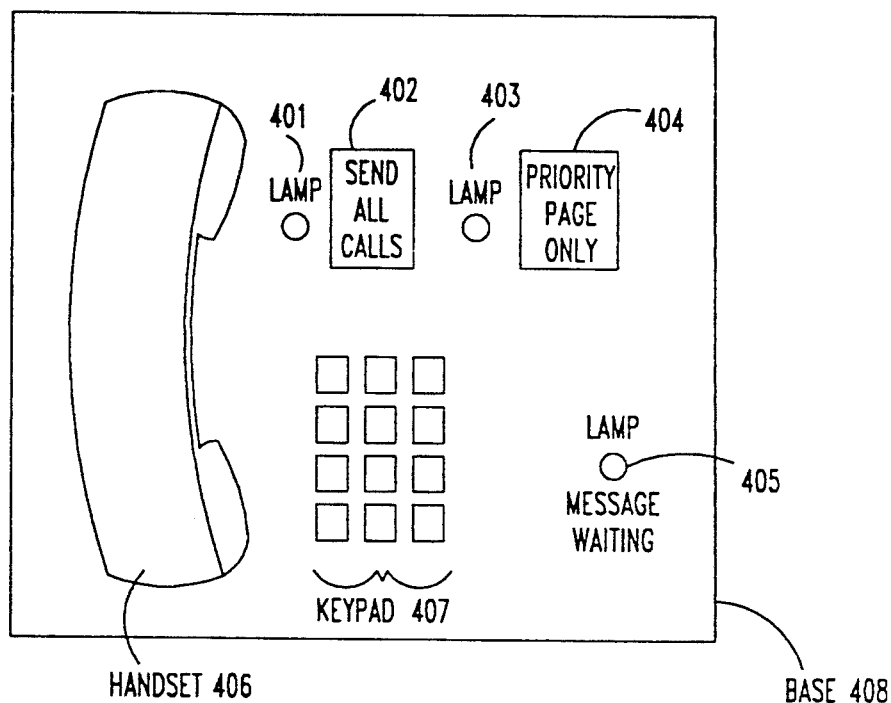
FIG. 4 is a representation of the physical arrangement of an exemplary wired or wireless communications device possessing full two-way communications capabilities for use in the communications system of FIG. 1.

The physical arrangement of an exemplary wired or wireless communications device is shown in FIG. 4. The communications device has several lamps and buttons in addition to the base 408, the key pad 407, and the handset 406. The send all calls button 402 is used to activate the send all calls feature which, as is well known, directs all calls from a communications device to a call coverage communications device and, in accordance with the present invention, can selectively direct all calls to any pager associated with a communications device. The send all calls lamp 401 is used to alert the user of the communications device that the call coverage feature is active, as such feature activation suspends ringing of the communications device in response to an incoming call. The send all calls button 402, with each button depression, toggles between the active and inactive states of the call coverage feature. The priority page button 404 is used to signal communication system 100 to alert a pager associated with the wired or wireless communications device only when such communications device is called by one of a predesignated list of calling party telephone numbers, extensions or alphanumeric identifiers, collectively set forth in priority number list 209 in FIG. 2. Priority page lamp 403 indicates whether this feature is active. The message waiting lamp 405 alerts the user of a retrievable message, e.g., a voice mail message. Lamp 405 is typically controlled by a communications system to be on when there is a message waiting and be off when either there are no messages to be retrieved or when all such messages have already been retrieved. The priority page button may advantageously be disposed only on a pager or may be replicated on both the wired or wireless communications device and its associated pager.

Figure 5:
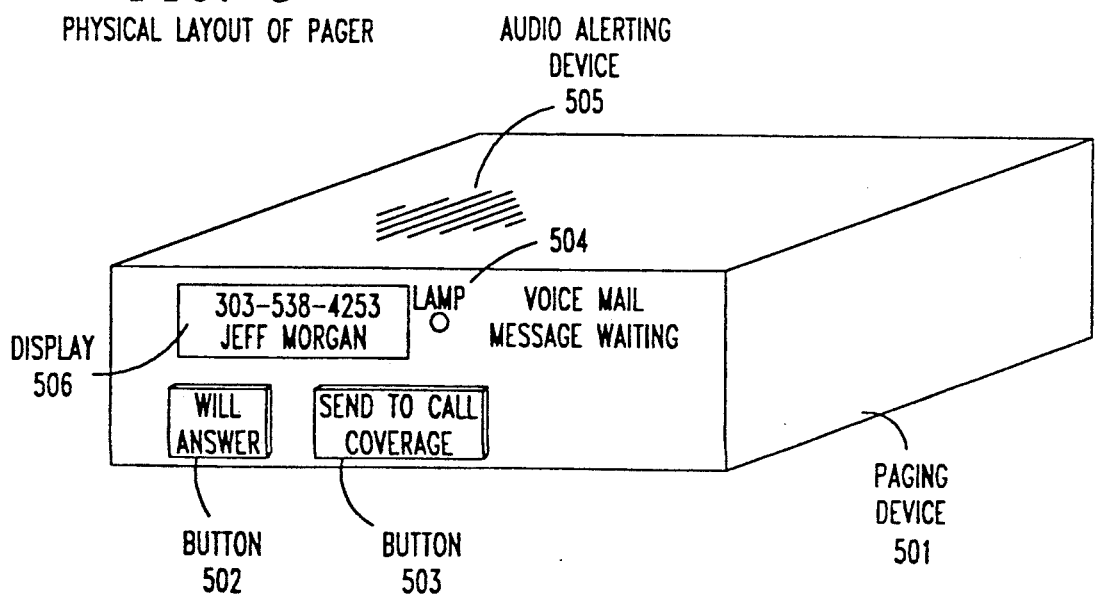
FIG. 5 is a representation of the physical arrangement of an exemplary pager for use in the communications system of FIG. 1.

FIG. 5 shows a typical pager device physical layout pursuant to the present invention. Paging device 501 includes an alphanumeric display 506 capable of displaying both the number associated with a calling party as well as the name or other identifying information of such a party. Paging device 501 also includes a message waiting lamp 504. In lieu of such a lamp, the function of the message waiting lamp can be provided by an icon which is selectively activated or illuminated on display 506. The user is alerted to a new incoming call by one or more audible tones emitted by audio alerting device 505. When a pager user hears such audible tones, such user has the option of either activating the will answer feature by depressing button 502 or activating the send to call coverage feature by depressing button 503 or not responding to the audible tone. If the will answer feature is activated, the pager signals that the pager user is going to a wired or wireless communications device to bridge onto the call. Such bridging can be provided to the wired or wireless communications device normally associated with the pager user or can be any wired or wireless communications device connected to the communications system. Moreover, the wireless communications device may encompass a well-known "telepoint" device location, i.e., a location where a base transceiver is disposed for public use, and which transceiver is designed to communicate with a user's wireless telephone device. Activation of the send to call coverage feature indicates that the pager user does not wish to answer the incoming call and that the predefined call coverage communications device should be alerted. This call coverage communications device can be any of the other wired or wireless communications devices connected to system 100. Advantageously, pursuant to the present invention, an incoming call is directed to the call coverage communications device when a pager user does not activate the will answer or send to call coverage feature after a predetermined time interval has elapsed from the time the pager has been alerted.

FIG. 6 shows the pager block diagram. Pager controller 617 receives information from communication system 100 via pager antenna 619, lead 618 and receiver 607 and transmits information to such communications system via this antenna 619, lead 618 and transmitter 605. In FIG. 6, a single pager antenna 619 is used and such use is typical of pagers wherein the transmit and receive radio frequencies are the same or closely spaced. If substantially different transmit and receive frequencies are used, then separate receive and transmit antennas can be employed.

Pager controller 617 is connected to display 506 by conductor 602. Conductor 602 couples calling party number and/or other alphanumeric information to the display. Audio alerting device 505 of FIG. 5, e.g., a loud speaker, alerts a pager user of incoming calls and is connected to the pager controller via conductor 604. The proximity antenna 620 is used to receive continuously or periodically transmitted, low-power, radio frequency (RF) signals from the associated wired or wireless communications device which are then coupled to proximity RF receiver 609 via conductor 621. Such signals can be a variety of types other than radio, such as infrared or ultrasonic signals. For the latter two types of signals, antenna 620 would be replaced by an appropriate transducer. Proximity receiver 609 compares the amplitude of the signals received by the proximity antenna to a predetermined value to determine if the pager is within a predetermined distance of its associated wired or wireless communications device. The results of this determination are coupled via conductor 610 to the pager controller which selectively activates the audio alerting device. Specifically, as will be described in further detail hereinbelow, when the pager is within a predetermined distance of its associated wired or wireless communications device, the pager controller does not activate the audio alerting device. The will answer button 502 and the send to call coverage button 503 are respectively connected to pager controller 617 by conductors 616 and 614. Similarly, the pager controller, in response to a message waiting for the associated wired or wireless communications device, activates message waiting lamp 611 via conductor 612.

The block diagram of the wired or wireless communications device is shown in FIG. 7. Connection 701 connects digital multiplexer/demultiplexer 702 to the associated LIC port. In the case of a wired communications device, connection 701 to the associated LIC is a wired one, while in the case of a wireless communications device, connection 701 is a wireless one to the wireless communications device transceiver and thence is a wired connection to the associated LIC port. Digital multiplexer/demultiplexer 702 separates voice or data from the signaling information. Voice information coupled from the associated line interface circuit port is provided to audio circuit 710 via conductor 709. Within the audio circuit, the voice information is amplified and processed and thence coupled through conductor 711 to handset 712. In similar fashion, audio information received by the microphone (not shown) within handset 712 is also coupled by conductor 711 to audio circuit 710.

Feature controller 703 receives signaling information from digital multiplexer/demultiplexer 702 via conductor 704. The handset switch hook 715 couples information to feature controller 703 as to whether the handset is on-hook or off-hook via conductor 716. Feature controller 703 also receives information through conductor 706 from the feature buttons 402 and 404 and lamps 401, 403 and 405 of FIG. 4. Message waiting lamp 405 is activated or deactivated by feature controller 703 using signals coupled through conductor 708. Low-power pager locator signal generator 713 outputs a continuous, low-power signal to antenna 714 which is used by the pager to deactivate its audio alerting device 505 when the pager and the associated wired or wireless communications device are within a predetermined distance of one another.

Refer now to FIGS. 6 and 7. Pager locator signal generator 713, proximity receiver 609 and pager controller 617 function together to selectively disable the operation of audio alerting device 505 when the pager is within a predetermined distance of its associated wired or wireless communications device. Advantageously, when the pager is within the predetermined distance of any other wired or wireless communications device, this disablement does not occur. To provide this selective disablement, a different digital code is assigned to each pager and its associated wired or wireless communications device and is used to identify a pager to such a device. The code word is generated within the wired or wireless communications device by feature controller 703 and coupled therefrom via conductor 717 to pager locator signal generator 713. Generator 713 generates digitally encoded continuous or periodic radio frequency signals containing the digital code and passes these signals to antenna 714. These signals are received by a pager via proximity antenna 620 and coupled to power threshold device 623. Device 623 determines if the received signal generated by pager locator signal generator 713 is above a predetermined power level which corresponds to the typical power level when a pager is within the predetermined distance of its associated wired or wireless communications device. If the received signal level is less than the predetermined power level, then no action is taken. When this is not so, the received signal is coupled from the power threshold device to digital code matcher 624 which determines if the received signal contains the digital code matching that of the pager and, therefore, indicating that the received signal emanated from the associated wired or wireless communications device. If the digital code word in the received signal matches that of the pager, then a signal is coupled to pager controller 617 via conductor 610 which causes the controller to send a signal through conductor 604 which disables the operation of audio alerting device 505. Of course, the threshold utilized by device 623 could be adjustable and such adjustment could be made manually by the pager user or could be done remotely using a signalling protocol received by pager controller 617 and coupled to power threshold device 623.

The operation of the present invention may be further understood by tracing the processing of an exemplary incoming call as set forth in the flow charts of FIGS. 8-11. Such figures describe the operation of call processor 109 of FIG. 1 in response to an incoming call with the sequence of call processor operations beginning at start connector 801 of FIG. 8. In the first operation, designated as step 803, call processor 109 locates the information in translation memory 111 and status memory 112 associated with the called number or extension. At step 805, data entry 305 in the feature status table is examined to determine whether the send all calls feature is activated. If so, at step 812 the call is sent to call coverage. From step 812, the sequence of call processing operations next proceeds to step 816 wherein the existence of call coverage extension data, designated as data entry 210 in FIG. 2, is determined. If no such call coverage extension data exists, then it is assumed that the called number or extension does not have call coverage. If, however, there is call coverage extension data, then call processor 109 will direct the application of a ringing signal to this call coverage communications device for a predetermined number of rings. If there is no call coverage extension data or if the call coverage communications device is not answered after the predetermined number of rings, then call processor 109 proceeds to step 818 wherein the call is sent to voice mail. If there is call coverage extension data and the call coverage communications device responds within the predetermined number of rings, then call processing proceeds to step 820 wherein the person answering the call at the call coverage communications device decides at step 822 whether or not the pager associated with the called party should be activated. Such activation can be accomplished by pressing one or more key pad buttons on the call coverage communications device. If the person at the call coverage communications device decides not to activate the pager, call processing proceeds to step 826 wherein the call is sent to voice mail. Finally, if the person at the call coverage communications device decides it appropriate to alert the pager associated with the called party, then call processing proceeds to step 824 wherein this pager is alerted and processing proceeds on to connector E.

Figure 10:
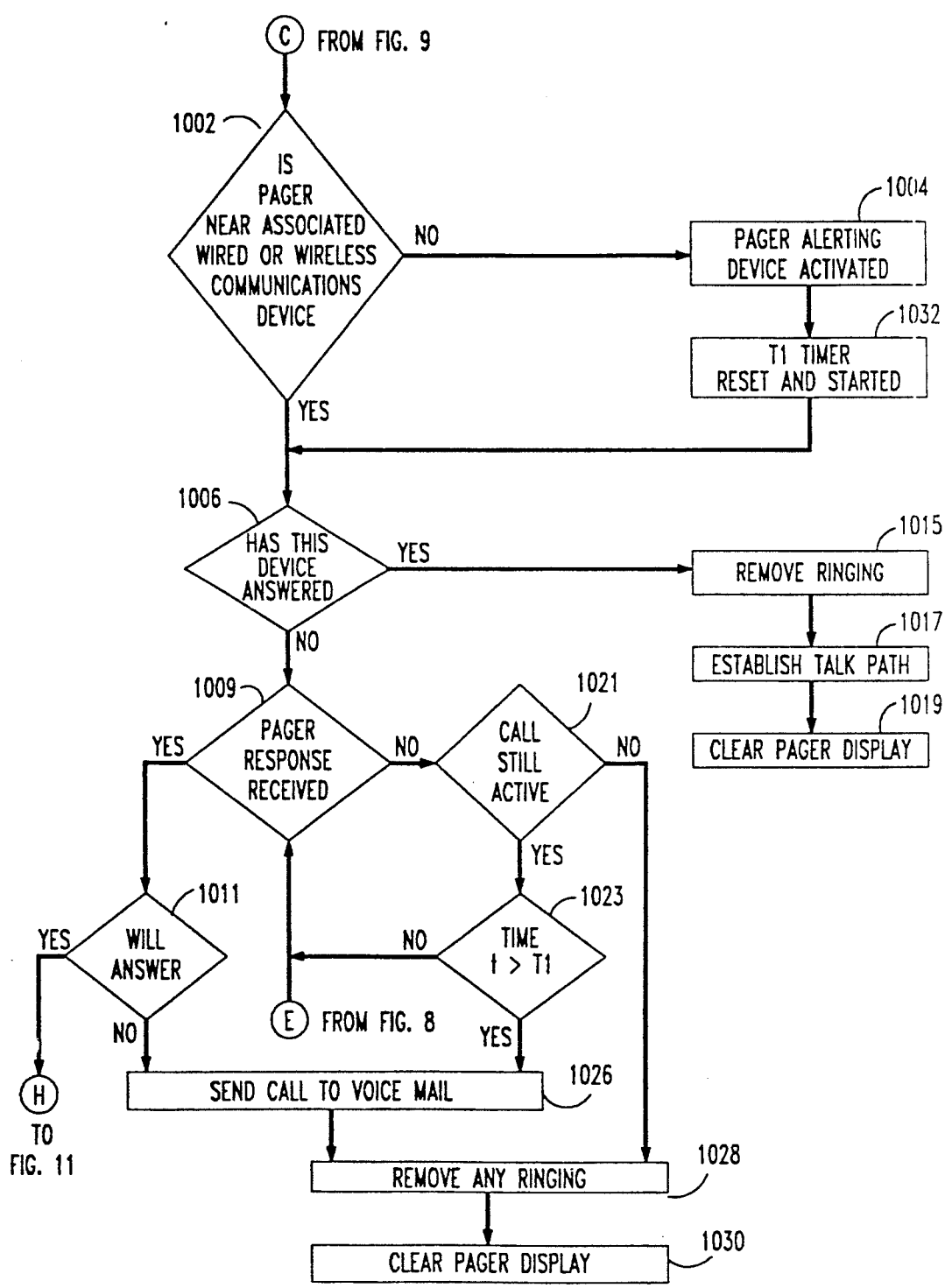
Figure 11:
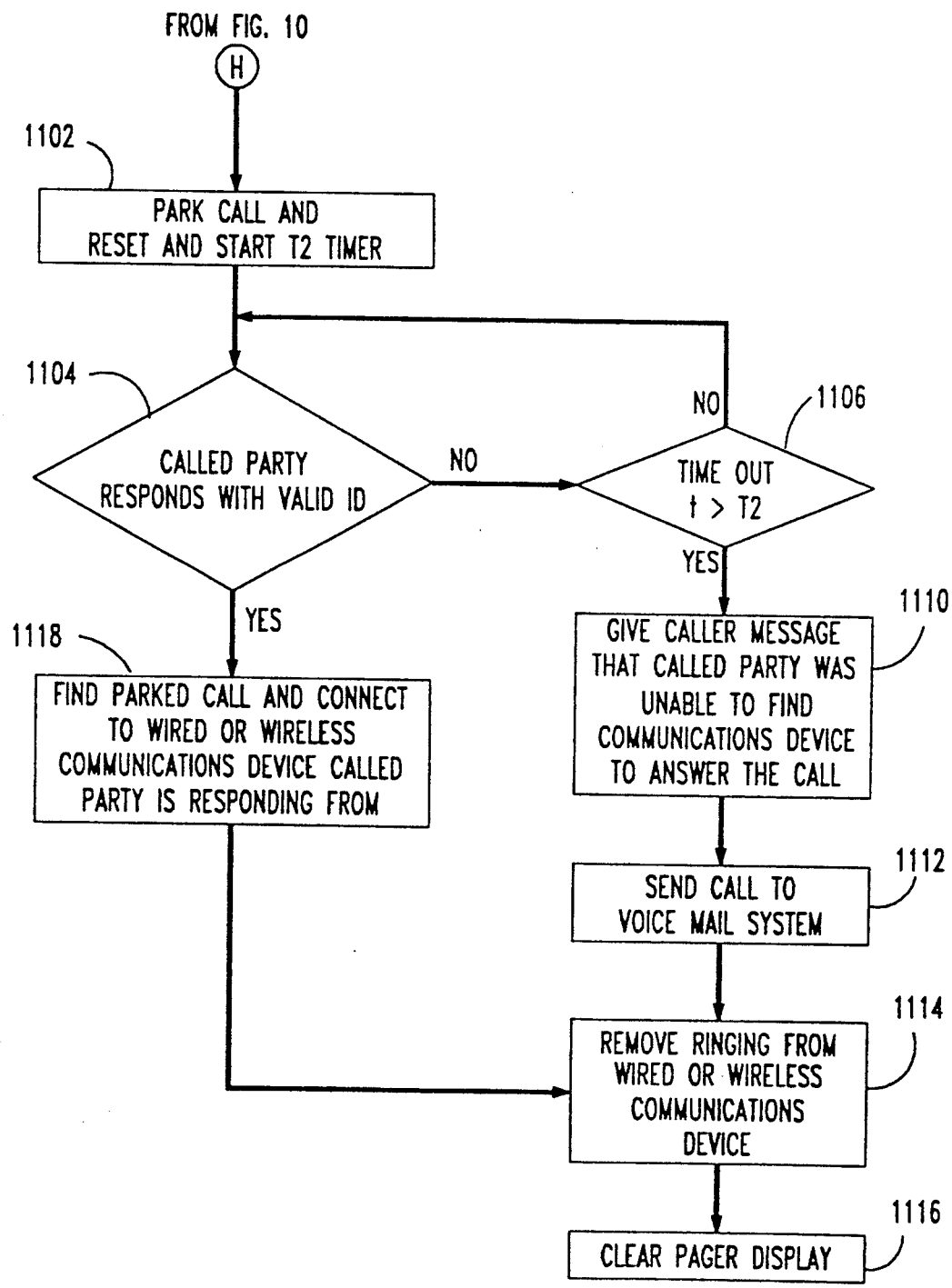

Once call processing reaches connector E, the subsequent processing is set forth in FIG. 10. As shown at step 1009, a decision is made relative to whether a response has been received from the alerted pager. A pager response is considered received when the pager codeword, designated as item 208 in FIG. 2, is received by the communications system within a predetermined amount of time. If no such pager response is received, call processing continues to step 1021 which determines if the call is still active. If so, processing proceeds to step 1023 which determines whether or not a preselected time interval has elapsed since the time the pager was alerted. This time interval is designated as T1. If the elapsed time interval is less than T1, call processing continues via path 1024 back to step 1009 and this step, along with steps 1021 and 1023, are repeated until either a pager response is received, the call becomes inactive or time interval T1 has elapsed. Once time interval T1 has elapsed, call processing proceeds to step 1026 where the call is sent to a voice mail system and then ringing is removed from the wired communications device and the pager display is cleared as respectively shown by steps 1028 and 1030.

Returning back to step 1009, if a pager response has been received, call processing continues to step 1011 which asks if the called party has indicated his/her intent to answer the page by depressing the "will answer" button on the pager device. If the will answer button has been activated within a predetermined amount of time, then it is assumed that the called party is en route to a wired or wireless communications device and call processing proceeds to connector H. Before examining the operations subsequently to connector H, let us consider the sequence of operations where the called party has not depressed the will answer button and, therefore, a pager response has not been received. The call processor now assumes that the send to coverage button has been depressed and at step 1026 the call is forwarded to the voice mail system. Now, let us consider what happens when step 1021 determines that the call is not active. Such a determination is made by looking at the appropriate status memory information, designated as 303-1 through 303-N in FIG. 3. If the call is not active, then, at step 1028, ringing of the communications device is terminated and, at step 1030, the pager display is cleared.

Return now to step 1011 and assume that the called party has indicated his/her intent to answer the call within a predetermined time interval by pressing the will answer button. Call processing now proceeds from connector H to step 1102 of FIG. 11 where the call is "parked" for further processing. The term parked means that the call is held, i.e., not terminated, pending a decision as to whether the will answer or send to coverage button has been depressed or whether a predetermined time interval T2 has elapsed. At step 1102, the timer for measuring time interval T2 is reset and then started. Call processing now continues on to step 1104 which determines if the called party has responded with a preassigned identification from a wired or wireless communications device connected to the communications system. Such a preassigned identification can be extension number 201 normally associated with the called party or a password typically known only to the called party and the communications system. If the preassigned identification has not been received, call processing proceeds to step 1106, and if the time interval T2 has elapsed, call processing continues on to step 1110. At step 1110, the calling party receives a prerecorded voice message that the called party was unable to find a wired or wireless communications device to answer the call and call processing now proceeds to step 1112 wherein the call is sent to a voice mail system and thence to steps 1114 and 1116 wherein ringing is removed from the communications device and then the pager display is clear. If the time interval T2 has not elapsed, then call processing returns to step 1104.

If the preassigned identification was received at step 1104, then, at step 1118, the parked call is identified using well-known techniques and is connected to the wired or wireless communications device from which the called party has responded with his or her preassigned identification. At this juncture, ringing is removed from the communications device associated with the originally called telephone number or extension at step 1114 and the pager display is cleared and processing concluded for this call at step 1116.

Figure 8:
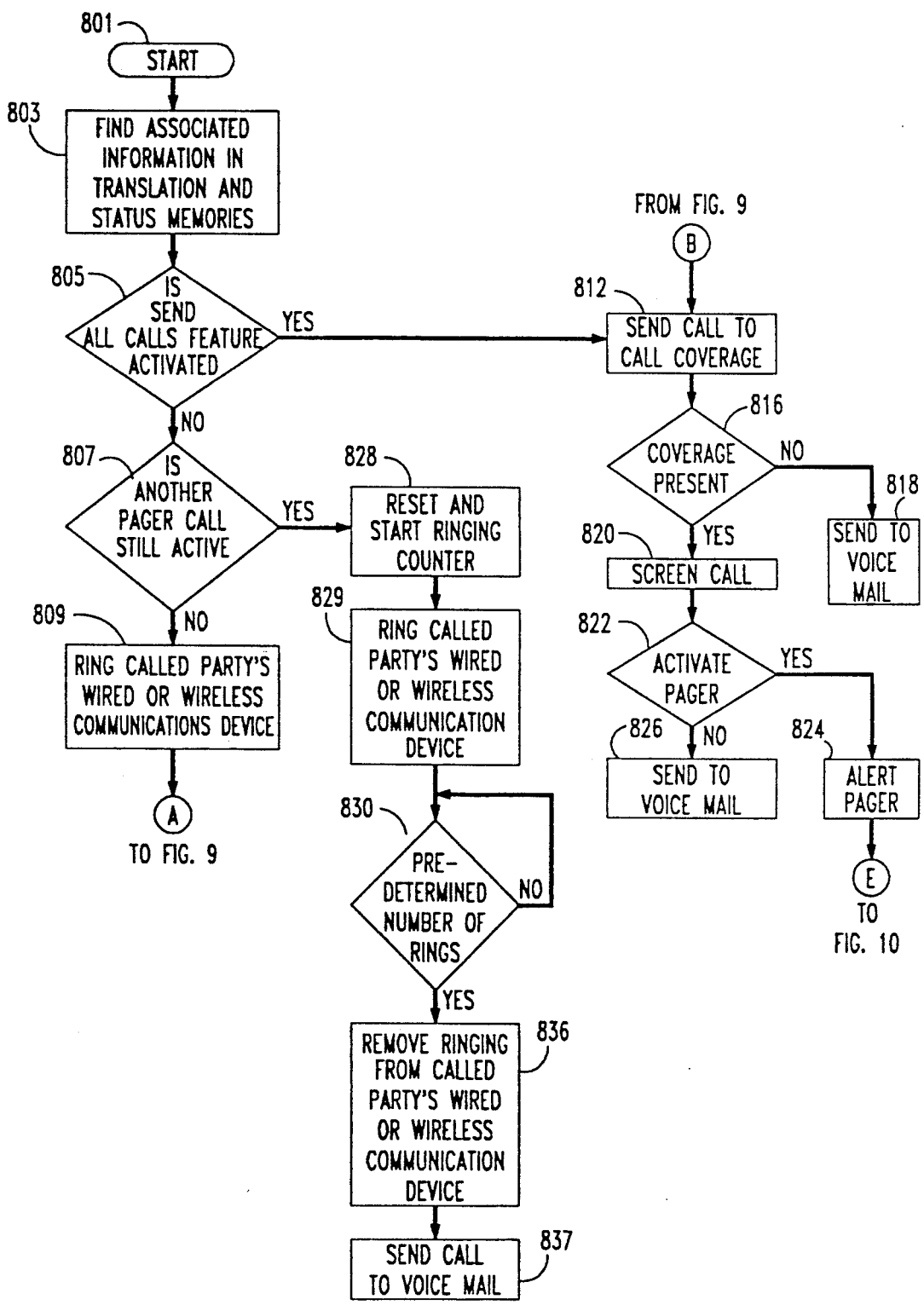
FIGS. 8–11 are flow charts depicting the sequence of operations provided by call processor 109 of FIG. 1 in accordance with the present invention.

Return now to step 805 of FIG. 8 which determines if the send all calls feature has been activated. First, let's examine the call processing when this feature has not been activated. At step 807, a determination is made as to whether the called party is currently being paged for a previously received call. If this is so, then in order not to confuse the called party by further alerting his or her pager, call processing proceeds to step 828 where a ringing counter is reset and started and thence a ringing signal is applied to the called party's wired or wireless communications device at step 829. This ringing is applied, as shown by step 830, for a predetermined number of rings and, once this number has been reached and the call has still not been answered, then, at steps 836 and 837, respectively, the ringing signal to the called party's wired or wireless communications device is terminated and the call is sent to the voice mail system.

Figure 9:
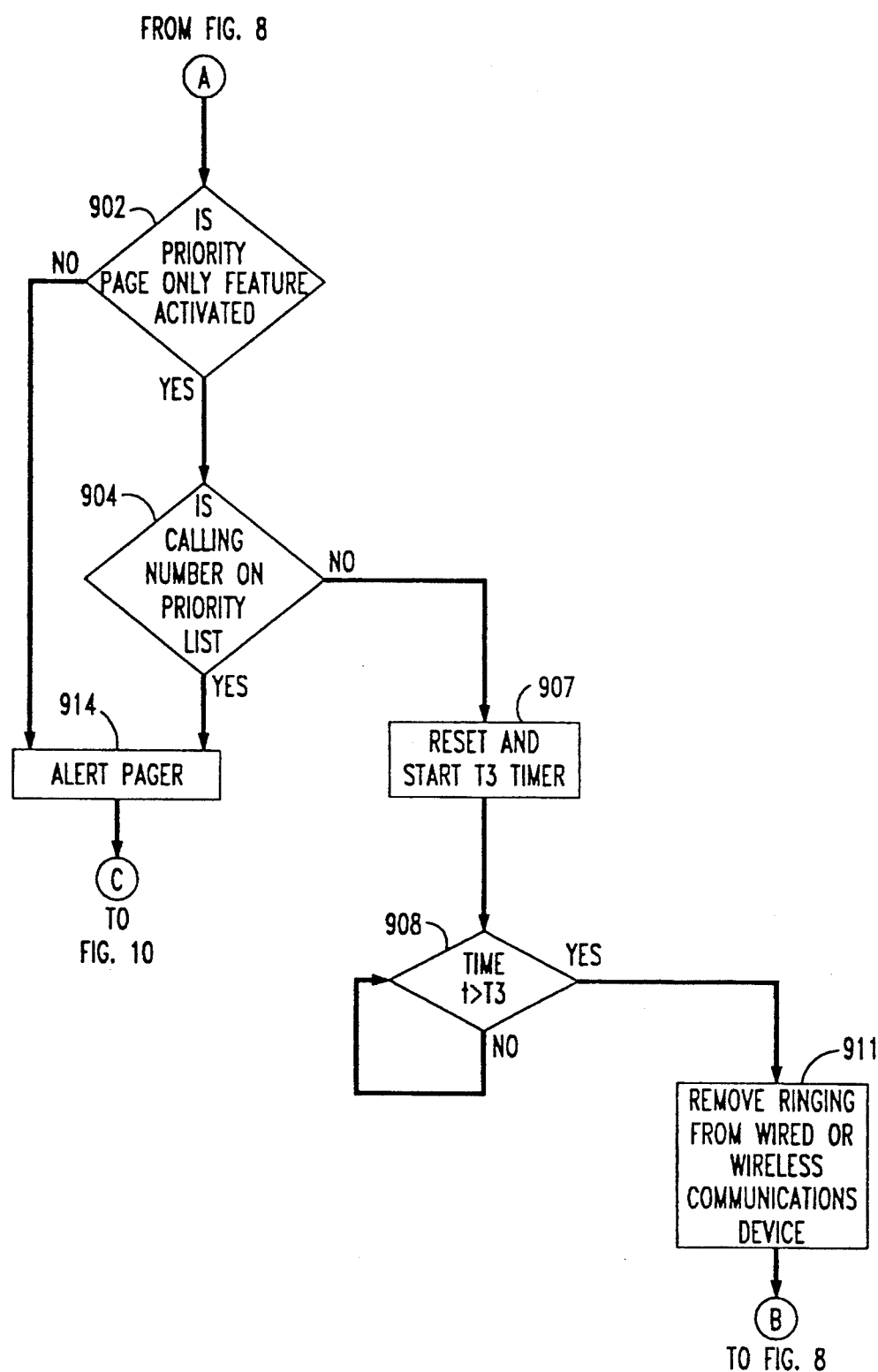

If the decision at step 807 is no, i.e., it is determined that the present call is the only active call for called party's number or extension, then call processing continues to step 809 which rings the wired or wireless communications device associated with the called party's number or extension and thence goes on to connector A. The call processing now continues, as shown in FIG. 9, at step 902 which determines if the priority page only feature has been activated for the called party's wired or wireless communications device. As discussed above, such activation is accomplished by pressing button 404 in FIG. 4. If this feature has not been activated, then the called party's pager is alerted at step 914 and processing continues on to connector C. If, however, the priority page only feature has been activated, then processing proceeds from step 902 to step 904 which determines if number or extension of the calling party number is on the priority list for the called party. If so, the pager is alerted at step 914 and processing proceeds to connector C. If the telephone number or extension of the calling party is not on the priority list, then, at step 907, the timer for time interval T3 is reset and started. Processing now advances to step 908 and is parked or remains there until the T3 time interval has elapsed. This allows for the wired or wireless communications device associated with the called party number or extension to ring a predetermined number of times even though the associated pager is not activated. Once time interval T3 has elapsed, processing continues on to step 911 where ringing is removed from the wired or wireless communications device and processing proceeds on to connector B and then on to block 812 of FIG. 8 which sends the call to call coverage. At this point, the call processing proceeds as previously described.

Now, let us trace the call processing after connector C of FIG. 9. Therefore, refer now to the top of FIG. 10 and step 1002 which asks if the pager is near, i.e., within a predetermined distance, of its associated wired or wireless communications device. This determination is carried out by proximity receiver 609 of pager block diagram of FIG. 6. If the pager is not near its associated communications device, then the pager's audio alerting device is activated at step 1004, the timer for measuring time interval T1 is reset and started at step 1032 and processing continues on to step 1006. If the pager is near its associated communications device, processing proceeds on to step 1006.

At step 1006, a determination is made as to whether the communications device has been answered. If the answer is yes, then ringing is removed from the communications device at step 1015, a talking path is established to this device at step 1017, and the pager display is cleared at step 1019 to conclude the call processing for this path.

Return now to step 1006. If the communications device associated with the called party is not answered, then processing continues on to step 1009 and proceeds as previously described.

While the present invention has been disclosed in reference to a particular embodiment, it should be apparent that other arrangements are possible within the spirit and scope of the present invention. First, for example, while the disclosed embodiment relates to a PBX, the present invention can be implemented within other communication systems such as the variety of switching systems disposed within a telephone central office or within a customer's premises. Second, while the disclosed communications between the pager and its associated line interface circuit is a radio signal, infrared or ultrasonic signals could be used instead. Lastly, while the integration of communications for a pager and other communications devices pertains to integrating voice communications, such integration can also pertain to data communications. Therefore, the wired or wireless communications device associated with a pager can encompass devices such as facsimile machines, video terminals, text terminals, and personal computers so as to alert a system user of incoming data communications.

We claim:

1. Apparatus for use in a communications system wherein an incoming call from a calling party is connected to a called party, said apparatus comprising means responsive to said incoming call for determining a paging device associated with said called party and at least one other communications device possessing communications capabilities different from that of said paging device and associated with said called party;

means responsive to the determined paging and other communications device for coupling an alerting signal to said paging and other communications device to alert said called party of said incoming call;

means responsive to a first signal transmitted by said paging device for temporarily suspending any further processing of said incoming call and suspending coupling of said alerting signal to said other communications device; and means responsive to a predetermined signal received from a communications device for reinitiating processing of said incoming call and coupling said incoming call to said communications device where it is received by said called party, said communications device being any in a set of communications devices including said other communications device.

2. The apparatus of claim 1 wherein said other communications device has two-way communications capability.

3. The apparatus of claim 1 wherein said other communications device is a wired telephone station set.

4. The apparatus of claim 1 wherein said other communications device is a wireless telephone station set.

5. The apparatus of claim 1 wherein said alerting signal is only coupled to said pager and said other communications device when said calling party is on a predetermined list specifying one or more potential calling parties.

6. The apparatus of claim 1 further including means responsive to a second signal transmitted by said paging device for directing said incoming call to a call coverage communications device, said call coverage device being specified prior to said incoming call.

7. The apparatus of claim 1 wherein said predetermined signal includes a password signal associated with said called party.

8. The apparatus of claim 1 wherein said communications device is a wired telephone station set.

9. The apparatus of claim 1 wherein said communications device is a wireless telephone station set.

10. The apparatus of claim 1 wherein said signal transmitted by said paging device is a radio signal.

11. The apparatus of claim 1 wherein said signal transmitted by said paging device is an ultrasonic signal.

12. The apparatus of claim 1 wherein said signal transmitted by said paging device is an infrared signal.

13. The apparatus of claim 1 wherein said suspending means also couples a predetermined voice announcement to said calling party announcing said called party's intent to receive said incoming call.

14. A pager for use in a communications system, said pager comprising
means for receiving a signal from said communications system in response to an incoming call for a called party associated with said pager and another communications device possesing communication capabilities different from that of said pager, the presence of said signal being accompanied by the coupling of an alerting signal to said another communications device; and
means for transmitting a first signal to said communications system indicating an intent of the called party to personally answer the call, said first signal temporarily suspending processing of said call and suspending coupling of said alerting signal to said another communications device, and said transmitting means also transmitting a second signal to said communications system indicating an intent of said called party not to personally answer said incoming call but to have said incoming call transferred to a call coverage communications device.

15. The pager of claim 14 wherein said first and second signals are radio signals.

16. The pager of claim 14 wherein said first and second signals are ultrasonic signals.

17. The pager of claim 14 wherein said first and second signals are infrared signals.

18. A communication system for coupling incoming calls from a calling party to a called party, said system comprising
at least one paging device;
a plurality of other communications devices associated with prospective called parties, each of said other communications devices possessing communications capabilities different from said paging device;
means responsive to signalling information in an incoming call for determining if any said paging device is associated with said called party and for determining which of said other communications devices is associated with said called party;
means responsive to any determined paging and other communications device for coupling an alerting signal to said paging and other communications device to alert said called party of said incoming call;
means responsive to a signal transmitted by said paging device for temporarily suspending any further processing of said incoming call and suspending coupling of said alerting signal to said other communications device; and
means responsive to a predetermined signal received from a communications device for reinitiating processing of said incoming call and coupling said incoming call to said communications device, said communications device being any in a set of said other communications devices including said other communications device, whereby said incoming call is received by said called party at said communications device.

19. A method for use in a communications system wherein an incoming call from a calling party is connected to a called party, said method comprising the steps of
determining, in response to said incoming call, a paging device associated with said called party and at least one other communications device possessing communications capabilities associated with said called party and possessing communications capabilities different from that of said paging device;
coupling an alerting signal to the determined paging and other communications device to alert said called party of said incoming call;
temporarily suspending any further processing of said incoming call and suspending coupling of said alerting signal to said other communications device in response to a signal transmitted by said paging device; and
reinitiating processing of said incoming call in response to a predetermined signal from a communications device and coupling said incoming call to said communications device, said communications device being any in a set of communications devices including said other communications device whereby said incoming call is received by said called party at said communications device.

* * * * *